United States Patent
Pilger

[15] 3,668,502
[45] June 6, 1972

[54] CONTINUOUS HYSTERESIS WIPER FOR ELECTROMAGNET IN INERTIAL GUIDANCE SYSTEM

[72] Inventor: Allan B. Pilger, W. Caldwell, N.J.
[73] Assignee: The Singer Company, New York, N.Y.
[22] Filed: Feb. 2, 1970
[21] Appl. No.: 7,913

[52] U.S. Cl. ................................. 318/653, 74/5, 307/101, 318/492
[51] Int. Cl. ........................................................ G05b 1/06
[58] Field of Search .................. 318/653, 492; 74/5; 307/101

[56] References Cited

UNITED STATES PATENTS

| | | | |
|---|---|---|---|
| 3,077,785 | 2/1963 | Stiles | 74/572 X |
| 2,959,722 | 11/1960 | Gilinson, Jr. | 318/492 |
| 2,636,996 | 4/1953 | Buess | 307/101 |
| 2,878,400 | 3/1959 | Nagel | 307/101 |

*Primary Examiner*—Benjamin Dobeck
*Attorney*—S. A. Giarratana and S. Michael Bender

[57] ABSTRACT

An inertial guidance system wherein one or more electromagnets are placed in a magnetic flux exchange relation with the flywheel of a gyroscope and are adapted to restore the gyroscope to a null position upon a signal from one or more pick-offs. An alternating current is applied to the energizing coils of the electromagnets and is of a magnitude large enough to nullify residual magnetic flux in the electromagnets due to hysteresis.

2 Claims, 2 Drawing Figures 3,668,502

INVENTOR.
ALLAN B. PILGER
BY
S. A. Giarratana
ATTORNEY

CONTINUOUS HYSTERESIS WIPER FOR ELECTROMAGNET IN INERTIAL GUIDANCE SYSTEM

BACKGROUND OF THE INVENTION

The present invention relates to an inertial guidance system, and more particularly to such a system including a gyroscope and utilizing at least one electromagnet adapted to restore the gyroscope to a null position.

IN U.S. Pat. No. 3,077,785, a gyroscope is disclosed which features the use of a flywheel driven by a drive shaft having a necked-down portion which provides a positive rotative drive connection between the shaft and the flywheel, while permitting flexing or pivoting action therebetween about both coordinate axes perpendicular to the spin axis. Therefore, when the flywheel is rotated at a high speed, it serves as an effective two-degree-of-freedom gyroscope tending to maintain the same orientation in space, with a slight relative tilting or pivoting between it and its casing about either axis perpendicular to the spin axis. A plurality of electrical pick-offs are disposed in proximity to the flywheel and are adapted to generate electrical signals proportional to this relative tilting. The pick-offs are connected in a servo loop with one or more torquers, in the form of an electromagnet in magnetic flux change relationship with the flywheel. The torquers receive the signal from the pick-offs and generate a magnetic flux which interacts with the flywheel to restore it to a null position.

However, residual flux builds up and is stored in the electromagnets due to hysteresis when the energizing current of the latter is turned off, or due to large sudden relative movements between the flywheel and its casing. As a result of this residual flux, it becomes extremely difficult to ensure consistent, accurate operation of the torquers.

SUMMARY OF THE INVENTION

It is therefore an object of the present invention to provide a system which permits the use of electromagnets in the above environment, yet nullifies the effects of residual flux as a result of hysteresis.

According to the present invention, an alternating current is applied to the energizing coil of each electromagnet, in a manner to nullify the effect of the residual flux.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and is not to be construed as restrictions or limitations on its scope.

In the drawings.

DESCRIPTION OF THE PREFERRED EMBODIMENTS

Figure 1:
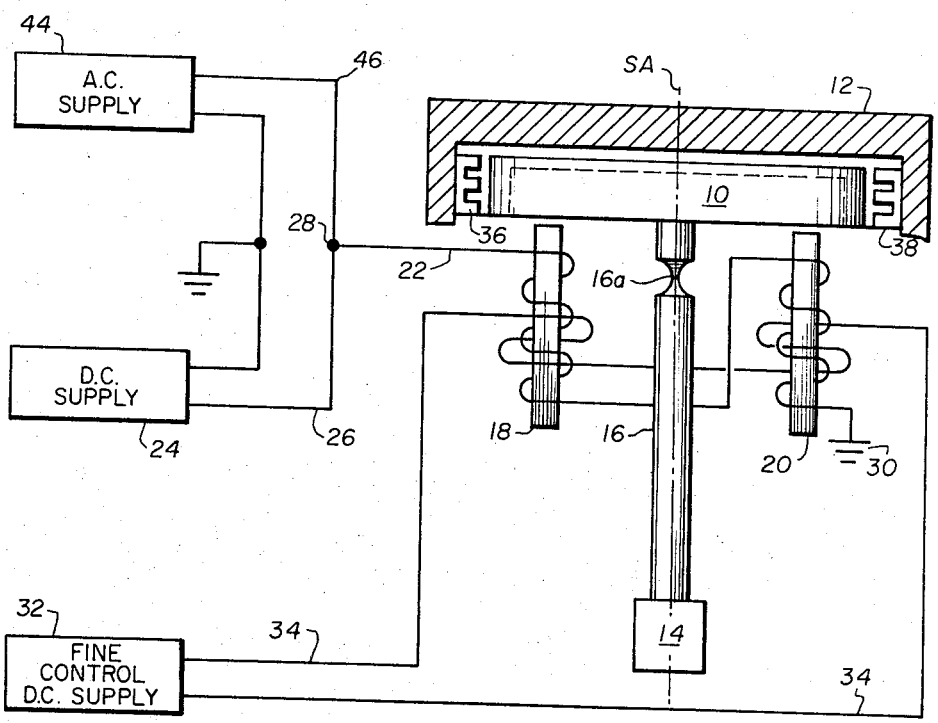
FIG. 1 is a schematic representation of the present invention.

Referring specifically to FIG. 1 of the drawing, the reference numeral 10 refers, in general, to a flywheel of a gyroscope which is described in detail in the above mentioned U.S. Patent. In particular, the flywheel 10 is mounted in a casing 12, a portion of which is cut away for convenience of presentation, and is rotated about its spin axis SA by a motor 14 connected to the flywheel by a drive shaft 16, it being understood that suitable bearing are provided within the casing for support of the drive shaft. As emphasized in the above mentioned patent, the shaft 16 has a necked-down portion 16a, the function of which is to provide a positive rotative drive connection between the shaft 16 and the flywheel 10, while permitting flexing or pivoting action therebetween about both coordinate axes perpendicular to the spin axis SA. Therefore, when the flywheel 10 is rotated at a high speed by the motor 14, it serves as an effective two-degree-of-freedom gyroscope which tends to maintain the same orientation in space despite a slight tilting or pivoting of casing 12 about either axis perpendicular to the spin axis SA in response to movements of the aircraft or other vehicle in which the system is mounted.

In these type arrangements a pair of magnets 18 and 20 are provided which are utilized to balance the spring torque provided by the necked-down portion in response to relative movements between the gyroscope and its casing. These magnets are shown enlarged in the drawing for convenience of presentation, and are formed into electromagnets by means of a conductor 22 wrapped around both magnets and supplied with DC current from a source 24 via a conductor 26 connected to the conductor 22 at a junction 28. The other end of the conductor 22 is connected to ground as shown at 30.

An additional direct current supply 32 is also provided to permit fine control or tuning of the flux from the magnets 18 and 20, and a conductor 34 extends from the supply 32, is wrapped around the magnets 18 and 20 in opposite directions, and extends back to the supply.

Figure 2:
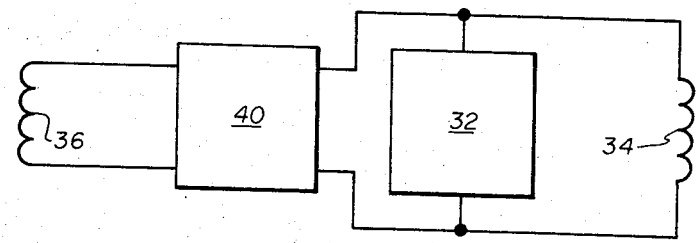
FIG. 2 is a circuit diagram, illustrating a feature of the present invention.

A pair of pick-offs 36 and 38 are supported on the inside wall of the casing 12 and are adapted to generate electrical signals in proportion to the relative tilting between the flywheel 10 and the casing 12 about either sensitive axis. These pickoffs may be of any known type, and, as shown in FIG. 2, the pickoff 36 is in the form of a sensing coil connected to a demodulator 40 which, in turn, has its output connected to the conductor 34. The DC supply 32 is also connected across the conductor 34 in parallel with the demodulator 40 to form a servo loop in a known manner.

Of course, the pickoff 38 is connected in the same manner and, in addition, two similar additional diametrically opposed electromagnets and pickoffs are disposed in a plane perpendicular to the plane of the drawings and are supplied by an additional DC supply in a similar manner.

As a result of the above, any relative tilting between the flywheel 10 and the casing 12 will cause an electrical signal to be generated by the pickoffs 36 and 38, and a corresponding change in the flux level produced by the magnets 18 and 20. Since the flywheel can also be of a magnetic material, the above flux causes a resulting attraction and repulsion with respect to the flywheel, and restores the latter to a null position.

According to the present invention, a supply of alternating current 44 is provided, with its output connected, via a conductor 46, to the junction 28. As a result, an AC signal is interposed on the DC signal through the conductor 22 and the combined signal thus passes through the latter around the magnets 18 and 20.

The magnitude and frequency of the AC signal from the supply 44 is selected so that the hysteresis loop formed thereby in connection with each electromagnet 18 and 20 is such that it will encompass any residual magnetic flux that would normally occur in the magnet. Therefore, the effect of the latter will be nullified by the continuous change in magnetization afford by the AC signal. This is due to the fact that the hysteresis losses as a result of the AC signal are in the form of energy expended in stressing the crystal fragments of the specimen and appear as heat.

Therefore, relatively small amounts of energy in stored magnetic form appearing at any point of the cycle will be lost as long as it is less than the energy expended as a result of the AC signal. For a more detailed discussion of this phenomena, reference is made to pp. 240–242 of the book "Electromagnets" written by John D. Kraus and published by the McGraw-Hill Book Co. in 1953.

Since the energy lost as a result of the AC signal can be accurately determined and the system calibrated accordingly, the effects of the residual flux is nullified despite periods of inaction, or relatively quick movements between the flywheel 10 and its casing.

Variations can be made in the foregoing without departing from the scope of the invention. For example, the AC signal can be combined with the DC signal in a different manner than disclosed above, and the AC signal may be broken up into several frequencies. Of course, other variations can be made by those skilled in the art without departing from the invention as defined in the appended claims.

I claim:
1. A gyroscope comprising:
a casing,
a flywheel rotatable about a spin axis relative to said casing,
drive means having a shaft having a flexure joint connected to said flywheel for driving said flywheel,
pickoff means for sensing the tilt of said flywheel,
torquer means for torquing said flywheel,
said torquer means including,
a fixed current DC supply,
a fine control DC supply,
an AC supply adapted to provide a continuous AC current of substantially constant magnitude,
a first conductor wound on said magnet and connected to said fine control DC supply,
a second conductor wound on said magnet and connected to said fixed current DC supply, and
a third conductor connected to said second conductor and connected to said AC supply so that said AC supply is arranged in parallel with said fixed current DC supply.

2. The gyroscope as claimed in claim 1, wherein said fine control DC supply has a demodulator, said demodulator being connected to said pickoff means.

* * * * *